Aug. 8, 1961 R. E. DAY 2,995,295
VARIABLE SPEED FAN DRIVE
Filed June 26, 1958
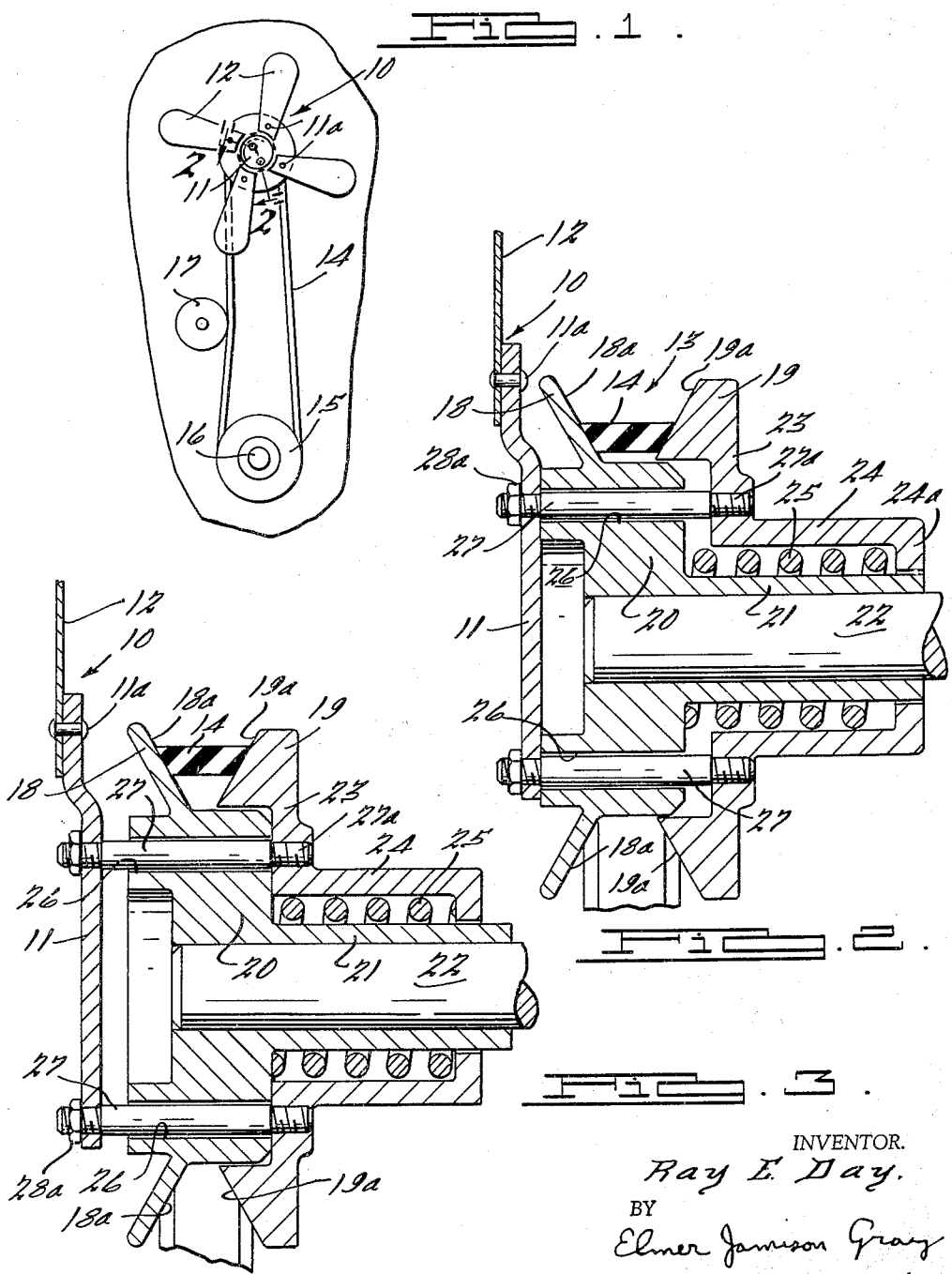
INVENTOR.
Ray E. Day.
BY Elmer Jamison Gray
ATTORNEY.

United States Patent Office 2,995,295
Patented Aug. 8, 1961

2,995,295
VARIABLE SPEED FAN DRIVE
Ray E. Day, 6656 Walton Ave., Detroit, Mich.
Filed June 26, 1958, Ser. No. 744,837
9 Claims. (Cl. 230—270)

This invention relates to a variable speed drive for the cooling fan of an internal combustion engine and in particular to an automatically adjustable or variable drive means for the cooling fan utilized to draw air through the coolant radiator associated with the internal combustion engine of an automobile or other automotive vehicle. Such drive means utilizes a belt driven V-type pulley composed of a pair of pulley members relatively adjustable axially to vary the effective diameter thereof and displace radially the operative position of the belt between and in driving engagement with the pulley members. With the effective diameter of the pulley at its minimum the belt operating therethrough will rotate the cooling fan at its maximum speed whereas successive increases in the pulley diameter will progressively decrease the rotational speed of the fan, this being desirable since the necessary rotative speed of the fan is substantially inversely proportional to the speed of the vehicle.

An important object of the present invention is to provide a variable driving means for the cooling fan associated with an internal combustion engine, said driving means being adjustable by the fan when driven within a predetermined rotational speed range.

A further object of the present invention is to provide a variable drive means for the cooling fan comprising a belt driven pulley composed of a pair of members relatively adjustable axially through the medium of said fan.

In accordance with the invention there is provided a pair of coacting juxtaposed pulley members driven by a belt disposed therebetween, one of the pulley members being adjustable axially relative to the other to vary radially the operative position of the belt. The adjustable pulley member is connected to a cooling fan which is axially movable therewith and effective at predetermined rotational speeds to axially adjust the same. The other or main pulley member is interposed between the fan and the axially adjustable pulley member which are connected together for axial movement as a unit by bolts passing freely through holes in the main pulley member. Interposed between the two pulley members is a coil spring which is calibrated so as normally to hold the generally converging working faces of the pulley members spaced apart the maximum degree thereby causing the belt to run near the bottom of the annular groove or channel between the members. Under this condition the pulley will be driven by the belt at its maximum speed which in turn will impart the maximum rotative speed to the pulley. However, as the fan increases in speed consequent to increasing speed of the vehicle the forces acting thereon consequent to drawing air through the radiator will overcome the spring forces and cause the fan to be displaced forwardly away from the main pulley member, thereby axially displacing the adjustable pulley member toward the main pulley member or, in other words, progressively bringing the pulley members closer together. This action results in successive increases in the effective pulley diameter thereby progressively decreasing the speed of rotation of the fan.

Other objects of this invention will appear in the following description and appended claims, reference being had to the accompanying drawings forming a part of this specification wherein like reference characters designate corresponding parts in the several views.

FIG. 1 is a front elevation of an engine fan drive in accordance with one embodiment of the present invention.

FIG. 2 is an enlarged fragmentary sectional view taken through lines 2—2 of FIG. 1 looking in the direction of the arrows, this view illustrating the pulley members spaced apart to maximum degree.

FIG. 3 is a view similar to FIG. 2 but illustrating the pulley members spaced apart the minimum degree.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Pursuant to the embodiment of the invention herein illustrated, by way of example, there is provided a cooling fan 10 which, in accordance with conventional practice, is mounted closely to the rear face of the coolant radiator of an internal combustion engine. This fan comprises a disk-shaped body member 11 to which is secured by riveting at 11a a series of four radially extending fan blades 12 of conventional construction.

As hereinafter described, the fan 10 is driven through the medium of a two-section pulley, indicated at 13, which is driven by a belt 14 from a conventional V-type driving pulley 15 mounted on the drive or crank shaft 16 of the engine. In order to maintain the belt 14 tight with respect to the pulleys 13 and 15 there is provided a suitable spring loaded take-up idler 17 which exerts the desired pressure against the belt to maintain it in proper relation to the upper and lower pulleys 13 and 15.

As illustrated in FIGS. 2 and 3, the pulley 13 is composed of a pair of relatively adjustable pulley members 18 and 19. The pulley member 18 is interposed between the cooling fan 10 and the pulley member 19 and forms a main driven front pulley member cooperable with the rear pulley member 19 which is axially adjustable. As illustrated, the pulley members are formed with generally converging working faces 18a and 19a forming a V-type pulley adapted to snugly receive the corresponding tapered edges of the belt 14.

The main pulley member 18 is formed with an annular body 20 having an integral rearwardly extending shank 21. The body and shank portions 20, 21 of the pulley member 18 are suitably journalled for rotation on a non-rotatable fixed shaft 22 secured in any suitable manner to the engine block.

The axially adjustable pulley member 19 is formed with an annular body 23 terminating in a rearward cylindrical shank 24 terminating in an inwardly extending annular flange 24a apertured to freely embrace the shank 21. Interposed between the body member 20 of the front pulley member 18 and the end flange 24a is a coil spring 25. Passing freely through holes 26 in the pulley body member 20 are four shoulder bolts 27. The rear threaded end 27a of each bolt is secured within a tapped hole in the body 23 of the rear pulley member 19. The forward end of each bolt 27 is fixedly secured at 28a to the fan body member 11.

The spring 25 normally functions to hold the working faces 18a and 19a of the pulley members spaced apart at maximum degree and also hold the body member 11 of the fan in abutting relation to the front face of the annular body 20 of the front pulley member 18. With the pulley members 18 and 19 spaced apart at maximum degree, as illustrated in FIG. 2, the belt 14 will run near the bottom of the annular working channel in the pulley 13. Predetermined increase in the speed of rotation of the fan consequent to increase in speed of the vehicle will cause the forces acting on the fan to overcome the force exerted by spring 25. This will result in progressive displacement of the fan 11 forwardly of the body 20 of pulley member 18. The maximum forward displacement of the fan is illustrated in FIG. 3, this being determined when the body member 23 of the pulley 19 abuts against the rear face of the body member 20 of pulley 18. The operation resulting in bringing the pulley members closer together results in increases in the effective pulley diameter thereby causing the fan to rotate at less peripheral speeds.

I claim:

1. In a variable speed drive for the cooling fan of an internal combustion engine having a drive shaft, a pulley comprising a pair of spaced pulley members, means including a belt for driving said pulley from the drive shaft, one of said pulley members having a rearward extension freely embracing a rearward extension of the other pulley member so as to be axially displaceable relative to said other pulley member, a cooling fan driven from said pulley, mounting means for said fan including means mounted on said other pulley member for connecting said fan and displaceable pulley member to provide for corresponding simultaneous axial displacement thereof relative to said other pulley member and consequent increase in the effective pulley diameter, and spring means interposed between said extensions and in abutting relation thereto for resisting said displacement.

2. In a variable speed drive for the cooling fan of an internal combustion engine having a drive shaft, a pulley comprising a pair of spaced pulley members, means including a belt for driving said pulley from the drive shaft, one of said pulley members having a portion freely embracing a portion of the other pulley member so as to be axially displaceable relative to said other pulley member, a cooling fan, means freely shiftable relative to said other pulley member for drivingly connecting said fan and pulley members while enabling simultaneous axial displacement of the fan and said displaceable pulley member relative to the other pulley member and consequent increase in the effective pulley diameter, and spring means interposed between said portions of the pulley members in abutting relation thereto for resisting said displacement.

3. In a variable speed drive for the cooling fan of an internal combustion engine having a drive shaft, a pulley comprising a pair of spaced pulley members, means including a belt for driving said pulley from the drive shaft, one of said pulley members having a portion freely embracing a portion of the other pulley member so as to be axially displaceable relative to said other pulley member, a cooling fan driven from said pulley, mounting means for said fan including means for connecting said fan and displaceable pulley member to provide for corresponding simultaneous axial displacement thereof relative to said other pulley member and consequent increase in the effective pulley diameter, and a coil spring confined between said portion of the pulley members for urging the same apart and into maximum spaced relation.

4. In a variable speed drive for the cooling fan of an internal combustion engine having a drive shaft, a pulley comprising a pair of spaced pulley members, means including a belt for driving said pulley from the drive shaft, one of said pulley members having a portion freely embracing a portion of the other pulley member so as to be axially displaceable relative to said other pulley member, a cooling fan, means freely shiftable relative to said other pulley member for drivingly connecting said fan and pulley members while enabling simultaneous axial displacement of the fan and said displaceable pulley member relative to the other pulley member and consequent increase in the effective pulley diameter, and a coil spring confined between said portions of the pulley members for urging the same apart and into maximum spaced relation.

5. In a variable speed drive for the cooling fan of an internal combustion engine having a drive shaft, a pulley comprising a pair of spaced pulley members, means including a belt for driving said pulley from the drive shaft, one of said pulley members having a portion freely embracing a portion of the other pulley member so as to be axially displaceable relative to said other pulley member, a cooling fan driven from said pulley, means for mounting said other pulley member to render the same non-axially displaceable and to dispose the same between said fan and displaceable pulley member, means for connecting said fan and displaceable pulley member to provide for corresponding simultaneous axial displacement thereof relative to said other pulley member and consequent increase in the effective pulley diameter, and spring means confined between said portions of the pulley members for resisting said displacement.

6. In a variable speed drive for the cooling fan of an internal combustion engine having a drive shaft, a pulley comprising a pair of spaced pulley members, means including a belt for driving said pulley from the drive shaft, one of said pulley members having a portion freely embracing a portion of the other pulley member so as to be axially displaceable relative to said other pulley member, a cooling fan driven from said pulley, means for mounting said other pulley member to render the same non-axially displaceable and to dispose the same between said fan and displaceable pulley member, means for connecting said fan and displaceable pulley member to provide for corresponding simultaneous axial displacement thereof relative to said other pulley member and consequent increase in the effective pulley diameter, and a coil spring interposed between said portions of the pulley members for urging the same apart and into maximum spaced relation.

7. In a variable speed drive for the cooling fan of an internal combustion engine having a drive shaft, a pulley driven from said shaft and comprising an axially displaceable pulley member and a non-axially displaceable pulley member spaced therefrom, an axially displaceable cooling fan driven from said pulley, means for mounting said non-axially displaceable pulley member to dispose the same between said fan and the other pulley member, means carried by said other pulley member for connecting said fan and displaceable pulley member to provide for corresponding simultaneous axial displacement thereof relative to said other pulley member thereby varying the effective pulley diameter, said pulley members having spaced generally converging working faces, and spring means confined between portions of said members and in engagement therewith for urging said working faces into maximum spaced relation.

8. In a variable speed drive for the cooling fan of an internal combustion engine having a drive shaft, a pulley driven from said shaft and comprising an axially displaceable pulley member and a non-axially displaceable pulley member spaced therefrom, an axially displaceable cooling fan driven from said pulley, means for mounting said non-axially displaceable pulley member to dispose the same between said fan and the other pulley member, means carried by said other pulley member for connecting said fan and displaceable pulley member to provide for corresponding simultaneous axial displacement thereof relative to said other pulley member thereby varying the effective pulley diameter, and spring means confined between portions of said members for urging said working faces into maximum spaced relation, said connecting means comprising members extending freely through said non-axially displaceable pulley member and forming driving connections between the fan and pulley members.

9. In a variable speed drive for the cooling fan of an internal combustion engine having a drive shaft, a pulley driven from said shaft and comprising a pair of spaced pulley members, means for mounting one of said pulley members so as to be axially displaceable relative to the other pulley member, a cooling fan driven from said pulley and also mounted for axial displacement relative to said other pulley member, and means for drivingly connecting said fan and pulley members, said means comprising members extending freely through said other pulley member thereby to provide for simultaneous axial displacement of the fan and said displaceable pulley member relative to the other pulley member and consequent variation in the effective pulley diameter, and spring means interposed between longitudinally spaced portions of said pulley members for urging said pulley members apart and into maximum spaced relation.

References Cited in the file of this patent

UNITED STATES PATENTS

| | | |
|---|---|---|
| 1,482,498 | Wills | Feb. 5, 1924 |
| 2,045,870 | Paton | June 30, 1936 |
| 2,173,661 | Perrine | Sept. 19, 1939 |
| 2,658,400 | Dodge | Nov. 10, 1953 |
| 2,819,703 | Suttle | Jan. 14, 1958 |